United States Patent [19]
Moore

[11] 3,944,008
[45] Mar. 16, 1976

[54] INSULATED, TUBE-FRAMED, LAND-TRAVERSING VEHICLE

[76] Inventor: Alvin Edward Moore, Manini Way, Diamondhead, Bay St. Louis, Miss. 39520

[22] Filed: Apr. 22, 1974

[21] Appl. No.: 462,734

[52] U.S. Cl. ............... 180/21; 52/275; 52/DIG. 9; 180/89 R; 280/92; 296/28 R; 296/29
[51] Int. Cl.² .................. B62D 61/00; B62D 29/00
[58] Field of Search .... 296/28 R, 28 L, 24 R, 24 C, 296/29, 28 J; 52/DIG. 9, 577, 275, 106; 280/92, 106 R; 180/89 R, 21

[56] References Cited
UNITED STATES PATENTS

| | | | |
|---|---|---|---|
| 1,288,371 | 12/1918 | Baskerville | 296/28 R |
| 1,550,526 | 8/1925 | Fekete | 296/28 R |
| 1,671,462 | 5/1928 | Bemis | 52/577 |
| 1,702,340 | 2/1929 | Gates | 52/275 X |
| 3,002,322 | 10/1961 | Dorsett | 52/275 X |
| 3,237,218 | 3/1966 | Moore | 9/2 A |
| 3,575,251 | 4/1971 | Moore | 180/30 |
| 3,596,622 | 8/1971 | Moore | 52/DIG. 9 |
| 3,802,367 | 4/1974 | Moore | 52/DIG. 9 X |

*Primary Examiner*—Philip Goodman
*Assistant Examiner*—John P. Silverstrim

[57] ABSTRACT

A vehicle adapted for overland travel, having: a top (or optionally bottom) vehicle-bracing frame of four end-joined angular members, each being angular in cross section, having elongated sides at angles to each other; tubular members, each formed of end-joined cans (or optionally of pipes that preferably are of plastic) and having joints of additional thickness of the pipe or can material; exterior skin means, preferably of mesh, and stucco of portland cement, epoxy putty or other cement and light-weight aggregate on the mesh; interior skin means that optionally may be of stucco on mesh or panels of plywood or the like; and insulation adjacent to tubular members. This insulation preferably includes light-weight, economical insulating material inside the cans or pipes. Optional insulation may include in-situ-applied foam plastic or strips of foam rubber placed in V-shaped spaces between sidewalls of the tubular members. The vehicle has: a front steerable wheel, having bearings in a motorcycle-like steering fork; a single rear driving wheel, aligned with the front wheel in a fore-and-aft driving axis that is laterally spaced from the central fore-and-aft line of the body - in travel between that line and the middle of the roadway; at least one sidewheel that is laterally spaced from the driving axis toward an outer edge of the roadway and rotates on the road; and, preferably, a second sidewheel that is laterally spaced from the driving axis toward the middle of the roadway and in normal forward travel is clear of the road, but contacts it on excessive vehicular roll.

24 Claims, 14 Drawing Figures

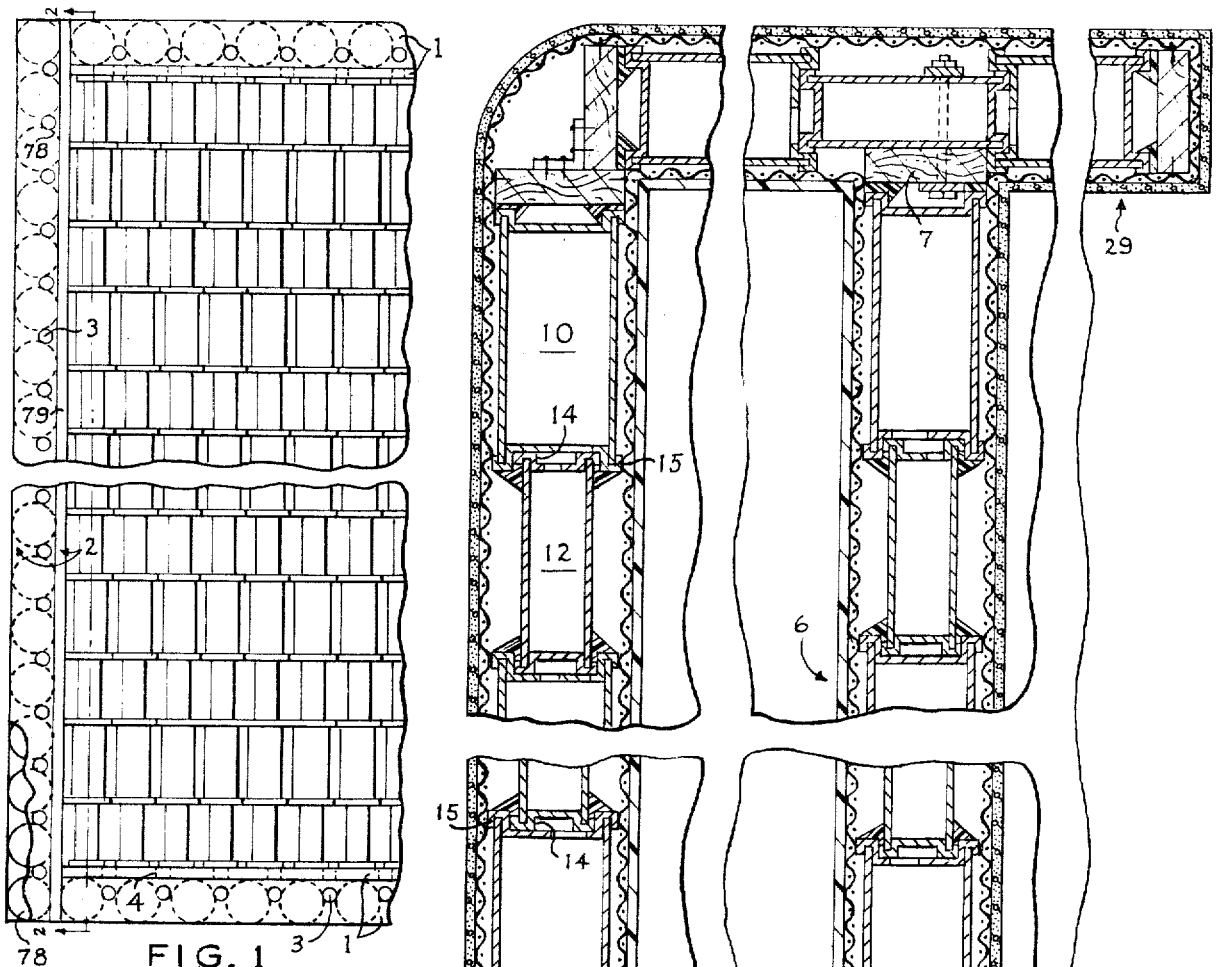
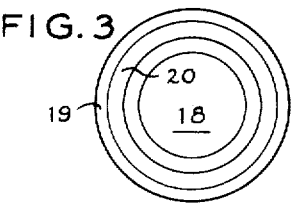
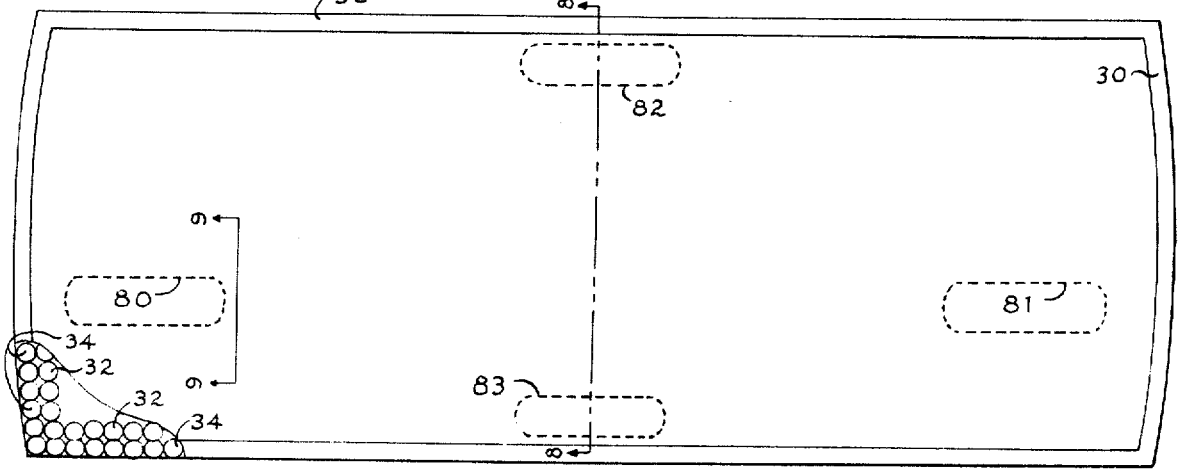

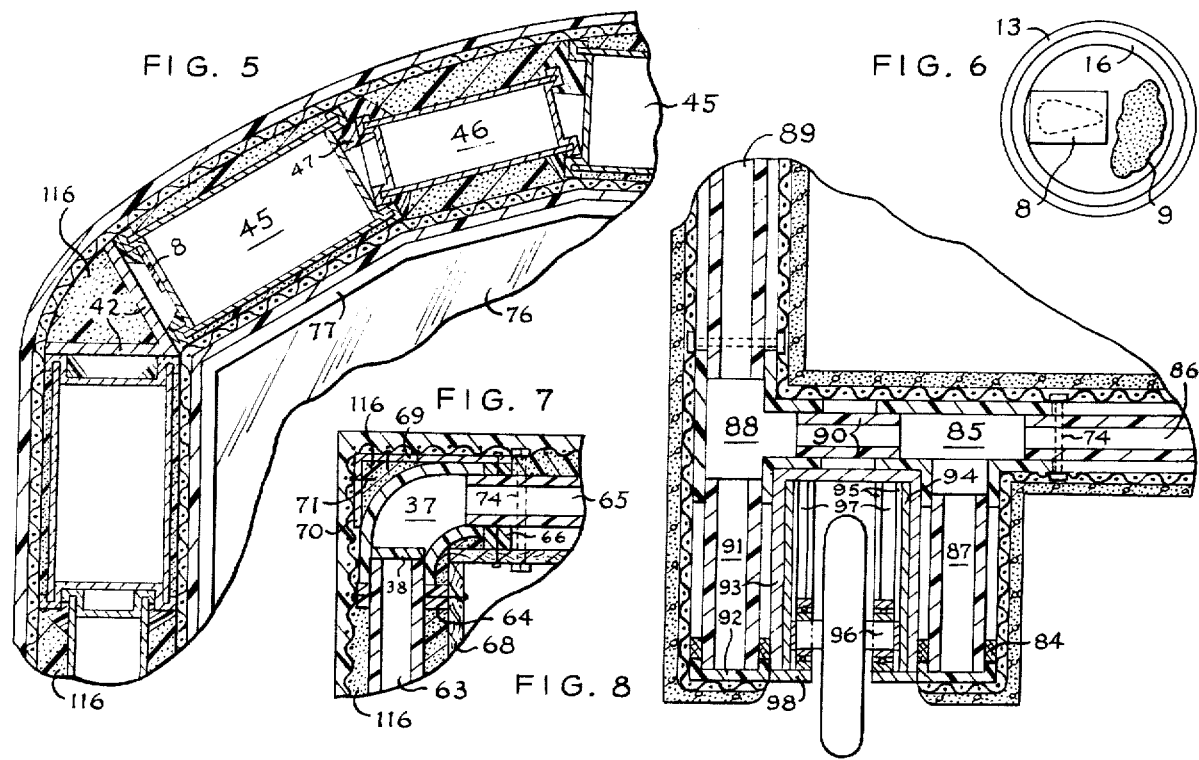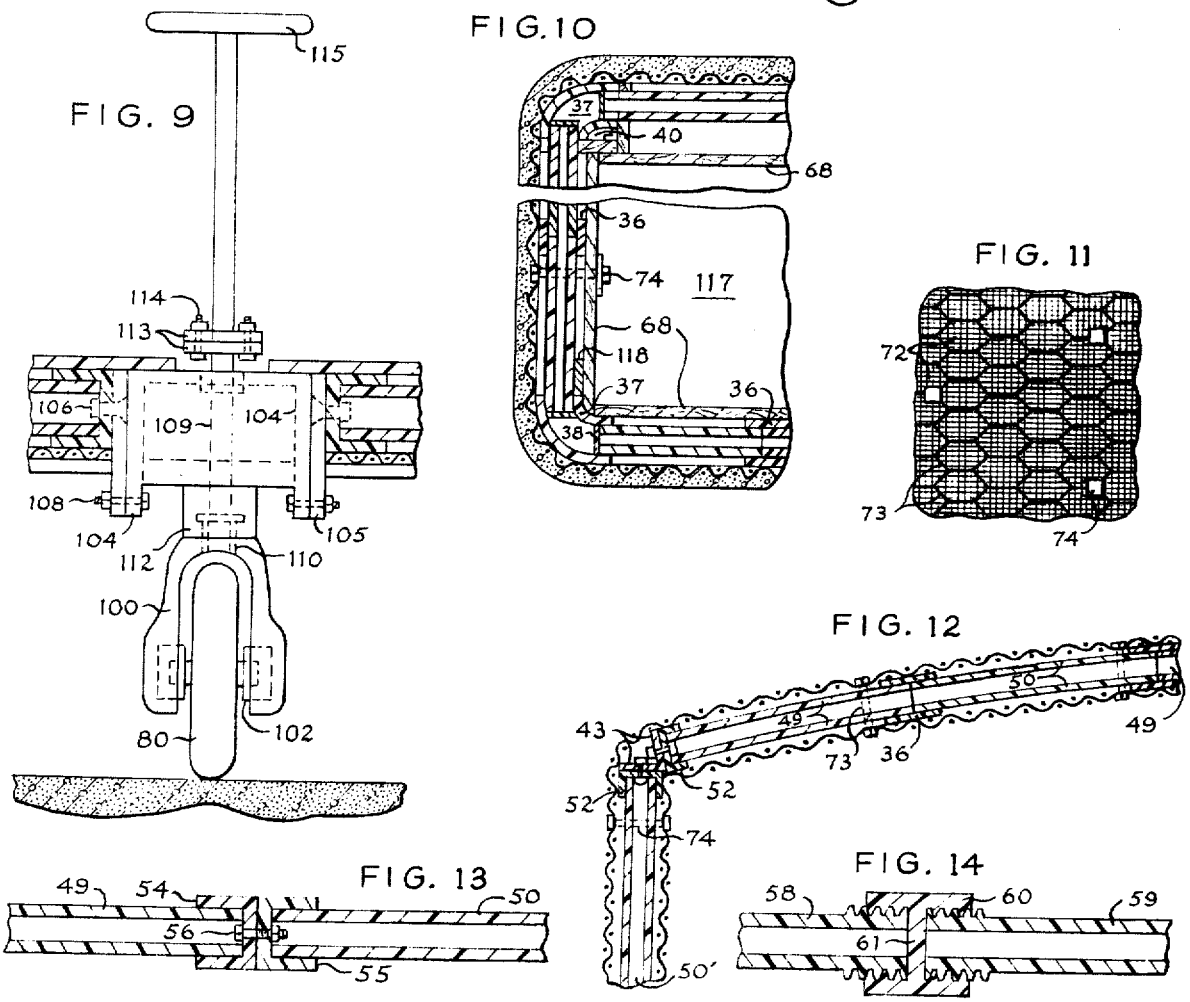

INSULATED, TUBE-FRAMED, LAND-TRAVERSING VEHICLE

This invention pertains to a light-weight, well-insulated, simply and economically built vehicle, capable of lessening damage in crashes, and easily repairable. In some respects it comprises improvements of the inventor's prior U.S. Pat. No. 3,575,251 of Apr. 20, 1971.

Some of the objects of this invention are: (1) a strong vehicle having a frame that is as light in weight as possible, consistent with strength, counteracting the heaviness of its power means, which preferably comprises an electric motor and batteries; (2) a wheeled vehicle having the simplicity, lightness in weight and economy of: only a single rear driving wheel (no heavy differential); a single front steerable wheel (no heavy steering gears, rods, levers and knuckle joints); front and rear wheels that are aligned in a longitudinal axis that is offset from the center fore-and-aft line of the vehicle; one sidewheel that is preferably on the road surface in normal travel; an optional and preferable second sidewheel that is a little clear of the road surface in normal travel, but contacts this surface on excessive vehicular roll; (3) a craft having excellent insulation (no heavy, complex, expensive air-conditioning system); (4) a vehicle having insulated upright walls, top and floor which include tubular members having jointed, light-weight strength, each member comprising a plurality of tubular elements, fastened together at pairs of adjacent tubular-element ends by extra-strength-providing junction elements that are spaced from each other by thin-walled tubes; the craft also preferably including economical insulation in the tubular elements, strong skin means, optional foamed plastic within the skin means, and elongated, vehicle-bracking angular members, fastened to tubular-member ends and to portions of the skin means, providing an elongated space sufficiently large for optional transmission of poured or injected foam-plastic liquids into spaces between tubular-member walls; (5) a craft as in (4) above, in which the tubular elements are new or used cans having fastened-together end-closure elements, and the skin means includes mesh, fastened to the cans, and stucco on the mesh; (6) a vehicle as in (4) above, in which the tubular elements are lengths of plastic pipe and the junction elements are plastic couplings, comprising sleeves over abutting ends of the pipe; and (7) a craft as in (4) above, in which the tubular elements are lengths of plastic pipe and the junction elements are screwthreaded couplings, each of which is on a pair of adjacent screwthreaded ends of the pipe lengths. Other objects and the specific structure of the invention will be apparent from the following specification and the accompanying drawings.

IN THE DRAWINGS

FIG. 1 is a top plan view, partly broken away, of the tubular frame of the invented vehicle, shown before installation of the exterior skin means and the foamed plastic, the jointed tubular members being illustrated as cans;

FIG. 2 is a view of the vehicle on a scale enlarged from that of FIG. 1, in vertical section from the plane 2—2 of FIG. 1, partly broken away, showing the skin means (here illustrated as comprising mesh and stucco) in place;

FIG. 3 is a plan view of an optional type of the new or used cans of the invention;

FIG. 4 is a top plan view of the invented vehicle, showing its front and rear walls as optionally curved, a portion of the body being broken away in section just above the floor level, indicating bumper rows of tubular elements extending around its lower part;

FIG. 5 is a fragmentary view in vertical section from a plane comparable to that indicated by the line 2—2 of FIG. 1, showing a curved top and an optional one-piece bracing and foam-plastic-conducting angled member;

FIG. 6 is a top plan view of another optionally used common type of used can, in which insulation has been placed;

FIG. 7 is a fragmentary view in vertical section from a plane comparable to that indicated at 2—2 in FIG. 1, showing a one-piece angular member as arranged in a square corner of the vehicle;

FIG. 8 is a fragmentary sectional view from the plane 8—8 of FIG. 4, showing a sidewheel assembly — before optional application of the foam-plastic liquids;

FIG. 9 is a view in vertical section (before addition of the foam plastic) from the plane 9—9 of FIG. 4, showing the tubular members as comprising pipe and pipe fittings;

FIG. 10 is a fragmental sectional view from a plane comparable to that indicated at 2—2 of FIG. 1, showing a forward portion (or a rear portion) of a side of the plastic-pipe-framed body — before application of the foam-plastic liquids;

FIG. 11 is a detail view of an optional and currently preferred composite mesh, adapted to be stuccoed in forming the skin means;

FIG. 12 is a fragmentary sectional view, illustrating a plastic-pipe body frame as having an arched top;

FIG. 13 is a fragmentary sectional view of an optional type of joint between adjacent pairs of tubular-element ends; and FIG. 14 is a fragmental sectional view of another optional type of this joint.

This invention comprises preferably apertured angular beams or angled plates fixed at vehicle-body corners to ends of divergent tubular members that have joints or nodes intermediate of their lengths, skin means fastened to the angular members and to the tubular members, preferable insulation in the tubular members, and optional foamed-plastic, the foaming liquids of which are injected or poured in situ thru holes in the skin into space within the sides of an angular member, whence these optionally supplied liquids pass into spaces adjacent to the tubular members and between exterior and interior skins. Three of the angular members are indicated in FIG. 1 at 1 and 2. These are exampled in FIGS. 5, 7 and 12 as made of metal and in FIGS. 2, 7 and 10 as comprising material that is sufficiently porous to provide for its penetration by nails or screws and their functional retention. But the material of each of the corner-bracing members shown in FIGS. 2, 5, 7, 8, 10 and 12, as well as the material of the elongated beams or bars 7 (FIG. 2) and 118 (FIG. 10), optionally may be wood, metal plate (preferably of aluminum alloy or thin steel), strong expanded metal or other metallic network, or plastic or portland cement set after passage of time and reinforced by fibers, excelsior, or cinders, and metal mesh or by other strengthening material. The angle portions of each of the angular members 1 and 2 are shown in FIG. 1 as apertured, having holes 3, 4, thru which optionally-used, mixed, foaming foam-plastic liquids may be applied in situ into spaces between the curved sidewalls of the tubular members. The ends of numerous tubular members are fixed by epoxy putty or other adhesive, 5, and optional bolts, screws or other fastening means to angled sides of the angular members; and numerous tubular members of the floor 6 are similarly fastened to the non-angular beams or bars 7. Although these tubular members optionally may be elongated plastic or metal pipes, extending nearly the full height or width of the vehicle, each preferably has at least one strengthening joint between its ends and comprises a plurality of end-joined tubular elements. In each of FIGS. 1, 2, 4, 5, 7, 8, 9, 10 and 12 to 14 these tubular elements optionally may be cans or lengths of plastic or of thin-metal pipes.

As illustrated in FIGS. 1, 2 and 5, they are cans — shown as of metal, but optionally they may be of plastic. Cans of the common kind that contain beer or soft drinks are shown in these figures and optionally, as illustrated, they are of two diameters and of the used type. When they are used cans they optionally may be resealed by bits of masking tape or other adhesive tape (8, FIG. 6). Optionally and preferably the cans may be filled with a light-weight insulation, 9. When they are sealed by the tape 8 or by sealing tops of new cans of the beverage-containing kind or by frictionally held paint-can-type lids this insulation may be low-priced sawdust, ground bark, cotton-seed or rice hulls, shredded cypress bark or pin-bark modules, ashes, cinders or the like; when it is organic it optionally may be dipped in or otherwise treated with low-cost preservative. In addition to this insulation inside the tubular elements of the upright walls, top and floor, other insulation between the sidewalls of the tubular elements may be used. This optionally may be: slender strips of resilient foam rubber (for example, cut from scrap foam-rubber pieces), forced by a putty knife or the like into V-shaped spaces between the tubular-element side walls, adjacent to the exterior skin, the interior skin, or to both of these skins; or foamed plastic applied via the spaces within sides of the angular members.

The cans of FIGS. 2, 5 and 6 are preferably of the beverage-containing type. The tubular elements 10 preferably are 14-ounce beer or soft-drink cans, having a diameter of approximately 2 and five-eights inches and a length of 5 and nine-sixteenths inches; and the elements 12 are 10-ounce beverage cans, having a length of 4 and three-fourths inches and a diameter of 2 and three-eighths inches. Each of these cans has an annular groove just inside its rim (13, 14, 15) that is shown at 16 in FIG. 6, but for convenience of drafting not shown in other figures. With reference to FIG. 2, the rim 14 of each of the smaller-diameter cans (here shown as enlarged for clear illustration) fits in the groove of a larger can and has a small clearance between it and the rim 15. Into this clearance, when the tubular member is sub-assembled, epoxy putty, solder or other bonding material is placed, to securely hold the adjacent can-end covers together. Each of the tubular members thus comprises a light-weight row of cans, having thin-material tubes of short length between relatively thick and strong bonded joints. In forming each of the rows illustrated in FIG. 2, numerous pairs of the larger and smaller cans are bonded together and two end sets of three cans each (two large cans and a small can between them) are bonded together. Then, at the bottom of an elongated, preferably upright fixture an end set of three cans is placed. Into the upper groove of the upper can of this trio epoxy putty, other cement or other bonding material is placed, and the rim 14 of a smaller can is moved down into position within the rim 15. Other pairs of the cans are similarly glued (or soldered) until the tubular member is complete.

Instead of the can of FIG. 6, the common can shown in FIG. 3 may be utilized. This container is of the paint-can type, having the lid 18 which snaps within and is frictionally held by the rim 19. The lid has a groove 20; and the can's bottom has a rim which is similar to the rim 19. The similar bottom rim of a smaller-diameter can fits within the groove 20; and the cans are bonded together in the above-described manner. Optionally all the tubular elements in a row, of the type of either FIG. 3 or FIG. 6, may be of the same diameter, and the cans may be welded, epoxy-glued or otherwise bonded together; but they are illustrated as of two diameters.

The elements 22 and 23 of each of the angled members or beams of FIG. 2 are fastened together by epoxy putty or other glue and nails or screws. They are further reinforced in a fixed angle by a plurality of corner braces 24 which are fixed to the wood or other porous material by epoxy putty and screws or nails. And each of the floor supporting beams 7 is strongly held against tubular portions of larger-diameter or optionally smaller-diameter cans of numerous tubular members by epoxy putty, an elongated piece of apertured pipe strap 26, and pairs of bolts 27, each pair of which closely flank the can that is between them.

In FIG. 2 a skirt as indicated at 29. This border optionally extends entirely around the body; and preferably a bumper set of cans, illustrated at 30 in FIG. 4, extends all around the skirt 29. Outside each row of cabin-wall tubular members, 32, only one row of bumper tubular members, 34, is illustrated in FIG. 4; but optionally there may be two or more bumper rows — a second row or several rows being outside the tubular members 34, between the flexible bumper skin and 34. The members 34 may be single elongated cans of resilient, shape-retaining plastic or vertically stacked tiers of the cans 10 and 12. In any event, the four rows 30 of these tubular elements or stacked cans preferably extends to or a little above the floor level, and preferably, the top skin of each of their side rows, on each side of the vehicle, serves as a step, leading to a door, the frame of which is fixed within a gap in the body walls. These bumper tubular members preferably are filled with frangible elements — for example, glass fibers, tufts of rock wool, shredded rigid foam plastic, preservative-treated popcorn, or the like. Optionally most of the skirt 29 may be eliminated, so that, except where the tubular supports for the sidewheels project below the floor, the bottom of the vehicle is shaped like that of FIG. 10, and in this event the optional bumper rows 30 are at and above the floor level, and the bottom corners of the body are preferably formed by two angular members that are similar to 22–23, except that they are inverted from their position at the top of FIG. 2 and the spaces within their angles and within the skin are faced downward and the upright cabin-wall stacks of cans are fixed to an upper surface of the inverted angle side 22.

In FIG. 10 the tubular elements are illustrated as end-joined lengths of pipe, shown as of plastic, but optionally of thin steel or aluminum alloy (preferably of extruded plastic or metal) or glass. The currently preferred type of these tubular elements comprises cut lengths of extruded, commercially obtainable plastic plumbing pipes of about two inches in diameter. They are cut to the desired length and end-joined within the plastic-pipe couplings 36. When the pipes are of polyvinyl chloride or chlorinated polyvinyl plastic a coat of solvent is applied to the end of a pipe and the socket of the coupling or other fitting, and the pipe is immediately inserted and rotated into final position. These couplings, as well as the elbow fittings 37 form strengthening joints or nodes in the tubular members and also serve the useful purpose of positioning and holding the exterior and interior body skins in even arrangement. This arrangement reduces the thickness of stucco required when the skin means comprises stucco on mesh. For such extra strength and evenness of arrangement two or more of these joints are provided between the ends of each tubular member of the walls, top and floor. Optionally, the pipe lengths may be sealed by pieces 38 of mastic tape or other adhesive tape.

The upper elbows 37, preferably of the commercially obtainable plastic type, are shown in FIG. 10 as within the angles of the angular beams. When, as is optional, the adjacent pairs of these elbows are not spaced but are in contact in the manner indicated in FIG. 4 at 32, 34, the optionally used, injected or poured plastic in liquid form may be efficiently transmitted to the spaces between the tubular members from the space 40.

In FIGS. 2 and 10 the top of the vehicle is shown as substantially flat, but preferably the top is arched; and such curvature may be achieved in the manner indicated in FIGS. 5 and 12. Here the angular members (42, 43) are not orthogonal, but each has an acute angle opening outward, toward the skin. Each of these angular beams may comprise: apertured, molded, reinforced plastic; apertured metal bars, welded together at abutting edges; angularly bent expanded metal (steel or aluminum alloy); apertured sheet-metal angles of the plaster-cornerbead type, or the porous nail-holding material described above. The acute angle of the angular member is such as to permit the adjacent ends of the tubular members, which conform to the desired curvature of the top, to lie closely against and be glued and/or bolted to surfaces of its sides.

In FIG. 5 the cans 45 and 46 are shown as having their end covers fastened together by epoxy putty of other bonding material, 47. Rims of the smaller cans 46 fit within and at points lie against the larger cans 45.

In FIG. 12, ends of lengths of plastic pipe, 49 and 50, are shown as end-joined by and within the couplings 36. At the angular member 43 of each upper corner of the vehicular body adjacent ends of the composite tubular members are sheathed and bonded in commercially obtainable end caps 52; and these end caps are fastened to the angular member by polyvinyl chloride solvent or epoxy putty or other glue and bolts or rivets. In forming each of these curved tubular members, straight, extruded-pipe portions 49 and 50 are cut to the desired lengths and their ends are fastsened in the couplings 36 and caps 52 by plastic solvent or glue. Then the tubular member is bent to the desired curvature. When the pipe lengths are of semi-rigid plastic the member may be bent without heating, but when, as is preferable, they are of rigid plastic they are sufficiently heated for bending into the curve.

FIGS. 13 and 14 illustrate two types of the intermediate joints of the tubular members, which optionally may be used instead of the coupling-formed nodes of FIGS. 10 and 12. In FIG. 13, two caps, 54 and 55, are bonded on ends of the tubes 49 and 50, and these end caps are fastened together by plastic solvent or epoxy putty or the like and/or bolts (or rivets), 56. Optionally, the composite element 54-55 may be integrally molded of plastic. In FIG. 14, the lengths of pipe 58 and 59 are of plastic, molded to provide at each end of the tubular element a screwthreaded portion of larger outside diameter than the middle part of the pipe length; and on these screwthreaded pipe ends the coupling 60 is screwed. This coupling optionally may be continuously screwthreaded from end to end, but preferably and as shown it comprises an integral, tubular-member-strengthening middle element 61. In a method of assembly of this tubular member the following steps may be taken: (1) coating the exterior threads of 58 and the internal threads of the left part of the coupling 60 with polyvinyl chloride solvent (or alternatively with epoxy putty or other glue); (2) screwing the left part of the coupling on the screwthreads of 58 until the element 61 is jammed tightly against the end of 58; (3) placing plastic solvent or glue on the threads of pipe 59 and of the right-hand part of the coupling 60; and (4) screwing the threaded end of 59 into the right socket of 60 until the end of 59 is jammed against the element 61. Optionally, the tubular elements 58 and 59 may be lengths of standard extruded pipe, and the screwthreads on 58 and 59 may be formed by a screwthread-cutting device.

FIG. 7 illustrates an elongated angular type of body corner, which, as indicated, may be on each side of the top, or reversed and used as a lower body corner on each side. The upper-end portions of upright tubular elements, 63, project thru openings in a non-angular beam 64; and the left-hand end portions of horizontal tubular elements 65 project thru holes in a similar beam 66. These beams are shown as of fiber-reinforced plastic, but they may be of any of the above-described angular-member or beam materials. They are fastened by nails, bolts or the like to the plywood or plastic panels 68 of the interior vehicle-body skin. (Optionally mesh and stucco may be substituted for this interior skin).

The elongated angular member in this corner (69-70) is turned upside down from the illustrated position of the angular members of FIGS. 1, 2, 5, 10 and 12 and the space between its angled sides thus is open toward the interior of the vehicle. Made of any of the above-described angular-member materials, this angular member is exampled in FIG. 7 as having a right angle in cross section, which is adapted to conform to a body top that is straight in transverse cross section. But when adapted to be used with an arched top of the type shown in FIG. 12 its subtended angle is obtuse. Its upper side 69 is preferably longer than its upright side 70 and is screwed, bolted and/or epoxy-bonded to the beam 66. Its upright part 70 is fastened by bits of epoxy putty to the row of elbows 37, and optionally also may be fastened by screws extending thru 70 and into and thru the outer curved walls of the elbows. Although this angular member may be penetrated by these optional screws and is penetrated by the screws, bolts or the like, 71, fastening the mesh to the angled member, and by the similar rod-like elements which fasten it to the beam 66, it does not necessarily have relatively large holes like 3 of FIG. 1, because preferably, no liquid plastic passes thru it. Its purposes are to form an angled, non-round, longitudinally-extending, tubular-member-corner bracing means and optionally, when in-situ-applied plastic is utilized, to provide an elongated space between the elbows 37 and the exterior skin, whence plastic liquids may pass between the sides of the elbows to the spaces between tubular members. However, these angular members 69–70, as well as each of the angular members of FIGS. 1, 2, 5, 10 and 12 may have many apertures because of being optionally made of angled stiff network, for example, of expanded steel or aluminum alloy sheet, or of reinforced plastic.

THE SKIN MEANS.

Each of the exterior and interior skins, in each form of the vehicle shown in FIGS. 2, 5, 7, 10 and 12, optionally may comprise: sheet metal or plastic sheets, plywood, masonite, or stucco on mesh. Preferably at least the exterior skin is of stuccoed mesh. Although this mesh may be of a textile fabric or apertured sheet metal or expanded metal or molded, apertured plastic, it is preferably wire network, and preferably of the lightweight, strong, composite type illustrated in FIG. 11. This comprises layers of hardware cloth 72, stretched around the tubular framework and fastened to it, having lap joints at their adjacent edges; and over this metallic-cloth mesh layers of larger-mesh fencing 73 (for example, diamond-mesh, poultry-fence material) are also stretched around and fastened to the tubular framework. This composite mesh is fixed to the framework by bits of epoxy putty extending thru the mesh to the tubular members and beams. Preferably, the hardware cloth and fencing are additionally fastened on the framework by extending the bolts 74 from the outside thru the exterior mesh, between spaced tubular elements, adjacent to joints or nodes of the composite tubular members, to and thru the interior skin. These bolts preferably fit in the parts of the diamond-shaped poultry-wire mesh where the wires are close together in a corner, so that the bolt heads clamp both layers of the exterior mesh to the framework, and when the interior skin is also stuccoed mesh the nuts of 74 are similarly positioned over corners of the interior diamond-shaped mesh. In stuccoing, the smaller mesh of the hardware cloth stops excessive penetration inward of the stucco, while the large-mesh, relatively large wire of the poultry-type fencing well reinforces the set stucco.

The stucco, sprayed or troweled on the mesh, comprises cement (portland cement, or portland cement and lime, or epoxy, or other cement) mixed with lightweight aggregate (for example: crushed, expanded, baked clay; expanded shale, cinders, pumice, bits of shredded cypress bark, or shredded or ground foamed plastic). The interior skin means optionally may comprise this stucco on mesh, or, as indicated in FIG. 10, panels 68 of plywood, masonite or sheet metal. The outside and interior surfaces of the skins comprise coats of paint or enamel.

The doors and windows comprise transparent elements (of plexiglass or glass), within frames of known type that are in gaps between tubular elements and epoxy-bonded and optionally bolted to end closures of these elements. Preferably there are only two doors. FIG. 5 illustrates a windshield having a transparent element 76, within a metal or molded-plastic frame 77. The lower edge of the transparent element 76 (not shown) at a level a little above that of the seat or seats, and from this level short tubular members extend downward to the floor area. A windshield of this type also may be used inside the framework of FIG. 12.

Optionally, in both FIG. 5 and FIG. 12 the top part of the windshield frame may be horizontal and straight and at a lower location than the top part of the frame 77 of FIG. 5. In this event, short upper tubular members, shown at 78 in FIG. 1, extend downward from the arched front angular member 2 to the straight top of the windshield frame. The top tubular part of each of these short upper tubular members is cut to fit beneath and against the bent or otherwise arched tube-holding, metal plate, to which the reinforcing plate 79 is fixed by welding or other bonding material. The tops and bottoms of these short upper tubular members are fastened by epoxy putty, welding or other bonding material to the upper arched member and the straight upper part of the windshield frame. Windshields of this general type are also provided for the vehicle bodies of FIGS. 2, 7 and 10, but when, as illustrated in FIG. 10, the top is transversely flat the angular member 2–79 is straight and the short tubular members between it and the windshield frame are of equal length.

THE WHEEL MEANS AND MOTIVE POWER.

Simplicity, economy and lightness in weight are achieved by the construction and arrangement of wheels and driving means indicated in FIGS. 4, 8 and 9. Here, the front steerable wheel 80 and the rear driving wheel 81 are in alignment along a longitudinal driving axis which is offset from the center longitudinal line of the vehicle. In America and other countries where motor cars travel on the right side of the road this offset is as indicated in FIG. 4; but the driving axis is not at the extreme left of the body.

There are two side wheels, 82 and 83, optionally located about midway between the forward and rear ends of the vehicle. These wheels optionally may be of the same size and optionally either normally on the road, or normally clear of it, contacting it on excessive rolling of the vehicle (in the manner of sidewheels referred to in the applicant's U.S. Pat. No. 3,575,251). Preferably and as shown, the wheel 82 is normally on the road surface, and the wheel 83, of smaller diameter than 82, is normally clear of the road surface, and only contacts it on roll of the vehicle toward the left by a predetermined amount. Optionally, the common axis of the wheels 82 and 83 may be at the rotary axis of the wheel 81. This rearward location of the side wheels is especially desirable when the vehicle is used on bumpy or otherwise poor roads.

FIG. 8 illustrates a currently preferred form of the assembly of each of the sidewheels 82 and 83 and its bearings and supports. This assembly is shown as comprising lengths of pipe, pipe tees and short lower beams 84; but obviously cans may be substituted for the short pipes, in which event short beams of the type shown at 7 in FIG. 2 may be used instead of the tees. As illustrated, this assembly comprises: a plurality of parallel tees 85, each of which is bonded by plastic solvent or epoxy to an end of a floor-frame tubular element 86; a short pipe 87 that is bonded in a downward projection of each of the tees 85; parallel tees 88, each being bonded on the lower end of a sidewall tubular element 89; a floor tubular member or element 90, bonded in a tubular projection of each of the tees 85 and 88; an upright tubular element or member 91, bonded in a downward projection of each tee 88; a cap 92, bonded to the lower end of each of the elements 87 and 91 and fastened by epoxy putty to a beam 84; a box 93, of metal or molded, reinforced plastic, open at its bottom, fixed by epoxy putty and rod-like fastening means (bolts, screws or the like) to the beams 84 and by epoxy putty to the tees 85 and 88; a pair of bearing and guide channels, fixed to inside surfaces of the box 93, each including a bearing strip 94 and flanges 95 between which the wheel bearings may vertically reciprocate; an optional slide and thrust bearing on each end of the axle 96; antifriction bearings on each side of the wheel; a pair of shock absorbers 97, of any known shock-absorber design; a pair of detachable bars 98, one of which supports the outer race of the antifriction bearing on each side of the wheel; and means comprising rod-like elements (bolts, screws or the like) detachably fastening the bars 98 to flanges on the forward and rear end-walls of the box 93. By jacking up the vehicle and releasing these rod-like fastening means at the forward and rearward ends of the bars 98, the sidewheel assembly, on each side, may be removed from the rest of the vehicle, for its repair or replacement.

The assembly of the motor, power transmission and rear driving wheel 81 may be of the type set forth in the inventor's prior U.S. Pat. No. 3,575,251 or any other known type of single, rear, vehicle-driving wheel and power means. Preferably: the power means utilized comprises an electric motor and batteries; and the motor, power transmission (preferably a chain and sprockets), the rear wheel, and its bearings are shock-absorbingly reciprocable in a housing which is detachable from below the vehicular body, for repair, replacement of parts or replenishing battery solution.

A preferred form of the assembly of the front, steerable wheel and its bearings and supports is shown in FIG. 9. This assembly includes: the wheel 80 and its axle; the rotatable fork 100, in the lower ends of which the outer races of the bearings 102 are held; a box-like or channeled metallic element 104 which bridges space between two of the parallel floor tubular members and has lower projections that extend below the bottom floor skin; the metallic plates or bars 105; epoxy putty and the bolts or other rod-like elements 106 which permanently fasten the plates 105 to the ends of the floor tubes that form a gap for interposition of the steering-wheel assembly; the bolts 108 which detachably fasten together the elements 104 and 105; the lower, detachable steering-post part 109 which is journaled in radial-and-thrust bearings mounted in or on the element 104 and has lower, annularly-arranged teeth or tongues which at 110 fit in grooves or valleys in the upper end of the fork 100, these cooperating teeth allowing the fork and wheel to move upward under shock, but preventing rotation between the fork and shaft part 109; the shock absorber 112 (of any appropriate known type), which absorbs shocks on the wheel and fork, cushioning their upper movement relatively to the steering post; the separable plates or disks 113, each of which is welded or otherwise fixed to an end of one of the steering-shaft parts; the bolts 114 which detachably fasten the elements 113 together; and the steering wheel 115 (or equivalent motorcycle-type handle bars).

The insulation of the vehicular body, making unnecessary any heavy, expensive air-conditioning equipment, includes: the gaseous material, in the body-framework tubular members, which preferably is the light-weight, economical insulation 9; the outer and inner skin material, which optionally includes the interior porous-material panels of FIGS. 7 and 10; and the optional above-described strips of foamed rubber or the like or else the optional foamed plastic 116 between the skins, sheathing the tubular members.

In assembly of the vehicle of FIG. 10 (or of FIG. 12, with the type of inner load-holder shown in FIG. 10), the following steps may be taken: (1) the box-like inner load-holder 117, comprising the interior skin of panels 68 of plywood or the like (preferably braced slightly above each lower corner at each side of the vehicle by an elongated metal beam 118, of the type shown at 7 in FIGS. 2 and 10) is fabricated; (2) re FIG. 8, the two sidewheel assemblies (minus the detachable wheels and shock-absorbers) are fixed below side-edge portions of the load-holder 117; and the steering-wheel assembly of FIG. 9 (minus the detachable steering-post part 109 and the wheel 80 and its shock absorber) is fixed below a forward portion of the load-holder; (3) the angular members of the upper corners shown in FIG. 10, including the upper elbows 37 (or those shown at 43 in FIG. 12) are fixed by epoxy putty and nails or bolts to upper corners of the load-holder 117; (4) the subassembled composite tubular members of the top (horizontal as in FIG. 10, or arched as in FIG. 12) are fixed to and between upright sides of the angular members; (5) the composite tubular members of the upright walls are fixed at their upper ends to the angular members (with their lower ends glued to the preferably apertured beams (or bars of metal plate or of strong expanded metal) 118 by bits of epoxy putty and temporarily resting on fixture bars) and the frames of the windows and doors are installed in gaps between shorter upright tubular members; (6) the incomplete framework is jacked up (or turned onto its side or top) and the subassembled floor tubular members and lower elbows 37 are fitted on the in-use lower ends of the upright tubular members; (7) exterior-skin mesh is fastened by epoxy putty and bolts, looped wires or the like to the tubular members and the skin or walls of the inner load-holder 117; (8) stucco of one of the above-described types is sprayed or troweled on the mesh; (9) the exterior is smoothed by use of sandpaper or the like; (10) optionally additional insulation is provided (the above-described strips of foam rubber or the like placed in the V-shaped spaces between exterior surfaces of the tubular elements, or foamed plastic applied in situ); if this additional insulation is provided by foamed-plastic liquids, holes are drilled thru the stucco and mesh, into the spaces between sides of at least two of the corner angular members, and mixed cement and hardener of foamed-plastic liquids are injected or poured thru these holes, and they are closed against pressure from the gas of the foaming liquids; (11) outer and inner coats of paint are applied; (12) the doors and windows are installed in their frames; and (13) the wheel and motive power assemblies are detachably fastened in place.

Various changes may be made within the scope of the following claims. For instance: instead of having larger cans (10 of FIG. 2 or 45 of FIG. 5) contiguous to the angular members, smaller cans (12 of FIG. 2 or 46 of FIG. 5) may be placed next to the angular members; the tubular members optionally may be filled with compressed gas, optionally mixed with the above-described tube-contained insulating material; and when the vehicle is adapted for use as an aircraft, as well as a land-traversing craft, wings may be provided, having spars extending across the top of the inner space and jutting out thru gaps in the sidewalls, and/or ballons may be attached to the top.

In the claims, unless otherwise specified: the word "plastic" means: synthetic or natural plastic; the term "bonding material" signifies: adhesive, or plastic material united due to plastic solvent, or welding, brazing, solder or the like; "insulating material" means fibers, particles, pellets, foamed plastic or other thermally insulating material; "stucco" signifies: aggregate of fibers, cinders, pellets, silica flour, pumice, sand, short shreds or cypress bark, or the like mixed with cement (portland cement or portland cement mixed with lime, lime, epoxy or other cement); the term "rod-like elements" means: nails, screws, rivets or the like; and the term "tubular members" means a plurality of tubular elements that are joined together along a straight or curved line.

I claim:

1. A vehicle, adapted to travel over land, including:
a body framework comprising: at least one body-bracing frame comprising a plurality of elongated, end-joined angular members forming a general vehicular cross-sectional outline, said angular members having spaces between their angled sides;
a plurality of upright tubular members;
a first set of vehicularly transverse tubular members;
a second set of vehicularly transverse tubular members;
each of said upright and transverse tubular members comprising a plurality of aligned tubes, joint means interconnecting adjacent tubes, and a pair of end elements at opposite ends of said tubular members;
means fastening one group of said end elements of said upright tubular members to first portions of said angular members;
means fastening said end elements of said first set of transverse tubular members to second portions of said angular members;
elongated, tubular-member-bracing means fastening said end elements of said second set of transverse tubular members to portions of said upright tubular members; and
means, connected to said body framework, for facilitating travel over land.

2. A vehicle as set forth in claim 1, in which the said means facilitating travel over land includes: a steerable wheel at a forward portion of the vehicle; and a rear vehicle-driving wheel, in alignment with said steerable wheel in a fore-and-aft, driving axis that is laterally spaced from the central fore-and-aft line of the vehicle.

3. A vehicle as set forth in claim 2, in which said means for facilitating travel over land further includes a side wheel laterally spaced from the said central fore-and-aft line, on the opposite side of said line from said fore-and-aft driving axis.

4. A vehicle as set forth in claim 3, in which said means for facilitating travel over land further includes a second side wheel having a middle plane on the opposite side of said central fore-and-aft line from said first-named side wheel; the said second side wheel being constructed and arranged to provide clearance between it and the road during normal travel of the vehicle over a substantially level surface, and to provide its rolling engagement with the road on sidewise tipping of the vehicle toward said middle plane by a substantially predetermined amount.

5. A vehicle, adapted to travel over land, including:
a body framework including: at least one body-bracing frame comprising a plurality of elongated, end-joined angular members forming a general vehicular cross-sectional outline, said angular members having spaces between their angled sides;
a plurality of upright tubular members;
an upper set of tubular members having longitudinal axes at angles to axes of some of said upright tubular members; and a lower set of tubular members having longitudinal axes at angles to axes of some of said upright tubular members; each of said upright and upper-set and lower-set tubular members comprising a plurality of aligned tubes, joint means interconnecting adjacent tubes, and a pair of end elements at opposite ends of said tubular members;
means fastening one group of said end elements of said upright tubular members to first portions of said angular members;
means fastening said end elements of said upper set of tubular members to second portions of said angular members;
vehicle-strength-providing means fastening said end elements of said lower set of tubular members to portions of said upright tubular members;
skin means, fastened to said body framework and tubular members; and
means, connected to said body framework, for facilitating travel over land.

6. A vehicle as set forth in claim 5, in which: said tubular members comprise cans; each of said aligned tubes in the tubular part of one of said cans; and the said joint means interconnecting adjacent tubes comprises can-end elements of each adjacent pair of cans and means fastening together said can-end elements.

7. A vehicle as set forth in claim 5, in which said upper set of tubular members and said skin means are constructed and arranged to provide higher and lower vehicle top portions, adapted to shed water from the top.

8. A vehicle, adapted to travel over land, including a body framework comprising: at least one body-bracing frame comprising four elongated, end-joined angular members, forming the general vehicle crossectional outline, said angular members having spaces between their angled sides;
a plurality of upright tubular members; a first set of transverse tubular members; and a second set of transverse tubular members; each of said upright and transverse tubular members comprising a plurality of aligned tubes, joint means interconnecting adjacent tubes, and a pair of end elements at opposite ends of said tubular members;
means fastening one group of said end elements of said upright tubular members to first portions of said angular members;
means fastening said end elements of said first set of transverse tubular members to second portions of said angular members;
elongated, tubular-member-bracing means fastening said end elements of said second set of transverse tubular members to portions of said upright tubular members;
wheel-supporting means comprising a plurality of auxiliary tubes and means connecting said auxiliary tubes to some of said tubular members;
and exterior, waterproof skin means, thermal insulation, and interior skin means adjacent said tubular members and said tubes.

9. A vehicle as set forth in claim 1, further comprising thermally insulating material within said tubular members.

10. A vehicle as set forth in claim 1, further comprising foamed plastic in said spaces between angled sides of said angular members and in spaces between sidewall surfaces of said tubular members.

11. A vehicle as set forth in claim 1, in which: the said frame is at the top of said body framework; the said second set of tubular members is at a lower part of said body framework; and the said tubular-member-bracing means comprises a pair of substantially horizontal beams at opposite walls of the body and means securely connecting said beams to elements of said walls.

12. A vehicle as set forth in claim 1, in which: said angular members comprise material capable of being penetrated by and frictional holding of rod-like-elements; the said vehicle includes exterior skin means comprising mesh and stucco, coating and impregnating the mesh; and the said vehicle further includes rod-like elements fastening said mesh to said angular members.

13. A vehicle as set forth in claim 1, in which: the said spaces between angular-member sides are open toward outer corners of said body and are in liquid-plastic communication with spaces adjacent to tubular elements via holes in at least some of said angled sides; and the said vehicle includes exterior skin means that is contiguous with vehicularly-outward edges of said sides.

14. A vehicle as set forth in claim 1, in which: the said spaces between angular-member sides are open toward the interior of the vehicle.

15. A vehicle as set forth in claim 8, in which: said tubular members comprise cans; each of said aligned tubes is the tubular part of one of said cans; and the said joint means interconnecting each adjacent pair of the tubes comprises a pair of can-end elements and means fastening the two can-end elements together.

16. A vehicle as set forth in claim 15, in which: said cans are of the used, type: and each pair of adjoined cans are of different diameters, the end cap of a smaller-diameter can fitting within rims of a larger-diameter can.

17. A vehicle as set forth in claim 15, in which: said cans are of the used, type and at least one of each pair of end-joined cans comprises a piece of adhesive tape closing a previously-made opening.

18. A vehicle as set forth in claim 1, in which: each of said aligned tubes comprises a length of pipe; and each of the said joints comprises a pipe coupling around adjacent pipe ends and bonding material between the pipe ends and coupling.

19. A vehicle as set forth in claim 18, in which said couplings and pipe ends have interengaging screwthreads.

20. A vehicle as set forth in claim 18, in which the said auxiliary tubes comprise upright lengths of pipe, and the said means connecting the auxiliary tubes to tubular members comprises: pipe fittings having tubular portions in which upper ends of said upright pipe lengths are fitted; other pipe-fitting tubular portions in which ends of floor tubular members are fitted; and bonding means between said tubular portions and tubular-member ends.

21. A vehicle as set forth in claim 18, in which at least some of said end elements comprise pipe-end caps and bonding material between said pipe-end caps and end portions of said pipe lengths.

22. A vehicle as set forth in claim 18, in which at least some of said end elements comprise pipe elbows and bonding material between tubular portions of said elbows and ends of pipe lengths.

23. A vehicle as set forth in claim 1, in which the said first-named set of vehicularly-transverse tubular members is at the top of the vehicle and comprises arched tubular members.

24. A vehicle, adapted to travel over land, including:
upright sidewall tubular members, each of which comprises lower pipe fittings and upper end elements;
a frame comprising elongated, end-joined angular members, substantially conforming to general crosssectional outlines of a top portion of the vehicular body, each of said angular members comprising elongated sides, including an upright side; the said sides being joined at angles to each other and having spaces between them;
means fastening said upper end elements to said angular members, each of said end elements being juxtaposed to an under surface of an angular-member side;
an upper set of vehicularly transverse tubular members, each of which comprises, between an opposite pair of said angular members: a plurality of pipes; at least one tubular-member-strengthening pipe coupling between and connecting adjacent pipe ends; and pipe-end portions that are contiguous to said opposite pair;
means fastening each of said last-named pipe-end portions to a said upright side of one of said opposite pair of angular members;
lower, elongated, tubular-member-bracing beams, and means fastening said beams to parts of said upright tubular members;
a lower, floor set of substantially horizontal vehicularly transverse tubular members, each of which comprises: a plurality of pipes; at least one tubular-member-strengthening pipe coupling between and connecting adjacent pipe ends; and pipe fittings at opposite ends of the floor tubular members, connected to said sidewall tubular members;
means for facilitating travel over land, connected to some of said tubular members; and
exterior, waterproofed skin means, adjacent to said tubular members, including a top skin, fastened to said upper frame.

* * * * *

UNITED STATES PATENT OFFICE
CERTIFICATE OF CORRECTION

Patent No. 3,944,008          Dated March 16, 1976

Inventor(s) Alvin Edward Moore

It is certified that error appears in the above-identified patent and that said Letters Patent are hereby corrected as shown below:

Column 7, line 65, before "at" insert -- is --.

Column 12, line 28, "in" should read -- is --.

In line 1 of each of Claims 9 to 14, claims reference numeral "1", should read -- 8 --.

Signed and Sealed this

Eleventh Day of January 1977

[SEAL]

Attest:

RUTH C. MASON
*Attesting Officer*

C. MARSHALL DANN
*Commissioner of Patents and Trademarks*